(12) United States Patent
Albu et al.

(10) Patent No.: US 6,320,565 B1
(45) Date of Patent: Nov. 20, 2001

(54) DAC DRIVER CIRCUIT WITH PIXEL RESETTING MEANS AND COLOR ELECTRO-OPTIC DISPLAY DEVICE AND SYSTEM INCORPORATING SAME

(75) Inventors: Lucian Remus Albu, New York City; Peter J. Janssen, Scarborough, both of NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/375,952

(22) Filed: Aug. 17, 1999

(51) Int. Cl.$^7$ .................................................... G09G 3/36
(52) U.S. Cl. ............................. 345/98; 345/94; 345/88
(58) Field of Search ............................. 345/87, 88, 89, 345/98, 99, 100, 95, 96, 97, 94, 208, 209, 210

(56) References Cited

U.S. PATENT DOCUMENTS

| | | | |
|---|---|---|---|
| 5,532,763 | 7/1996 | Janssen et al. | 348/744 |
| 5,670,979 | 9/1997 | Hug et al. | 345/100 |

FOREIGN PATENT DOCUMENTS

9600479A2    1/1996   (WO) .

*Primary Examiner*—Xiao Wu
(74) *Attorney, Agent, or Firm*—Laurie E. Gathman

(57) ABSTRACT

In a digital-to-analog (DAC) driver circuit for a color electro-optic display device employing a global ramp generator, color artifacts caused by the residual state of the electro-optic material of the pixels from previously addressed data signals are substantially reduced or eliminated by providing a resetting pulse from the ramp generator to selected pixels prior to addressing with the next set of data signals.

11 Claims, 6 Drawing Sheets

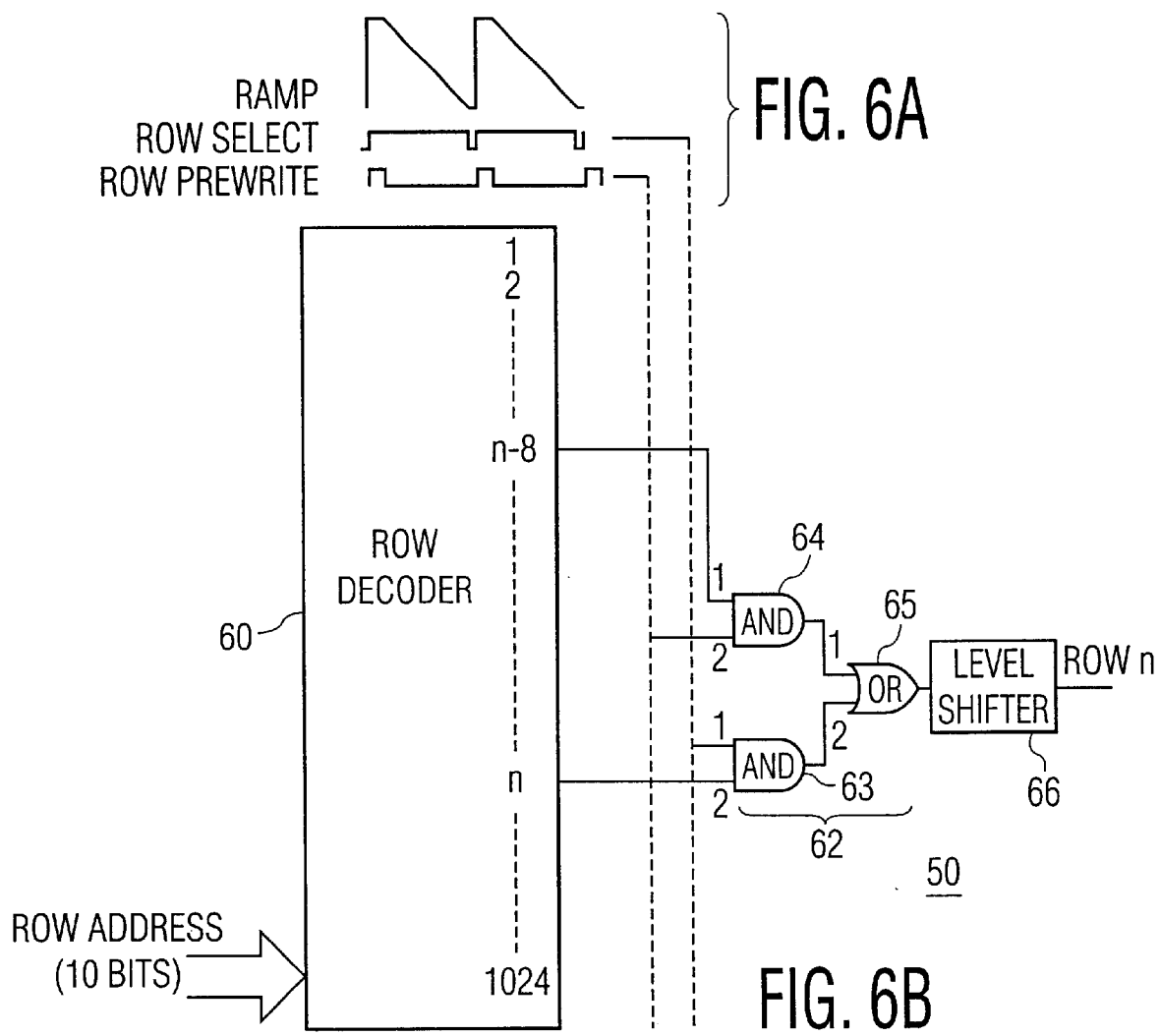

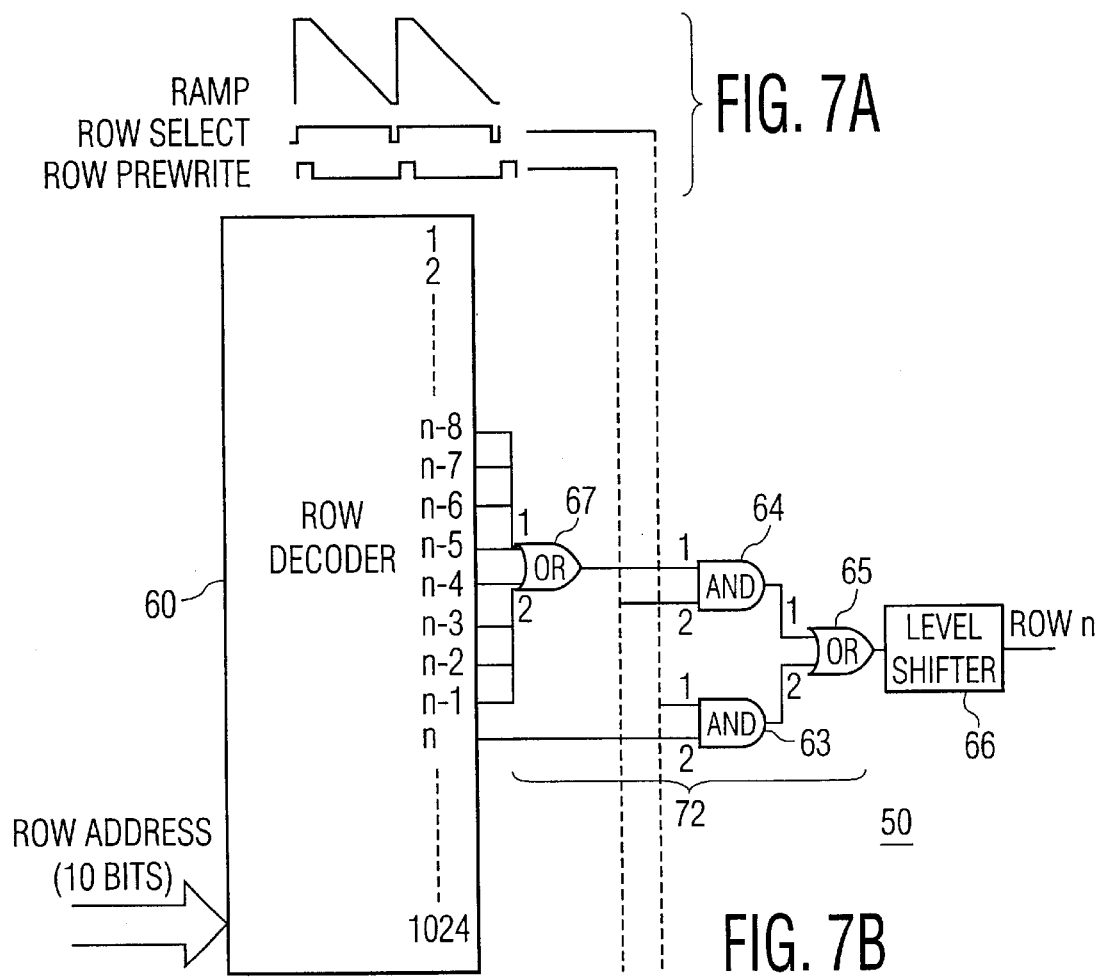

DAC DRIVER CIRCUIT WITH PIXEL RESETTING MEANS AND COLOR ELECTRO-OPTIC DISPLAY DEVICE AND SYSTEM INCORPORATING SAME

BACKGROUND OF THE INVENTION

This invention relates to color display systems which employ one or more electro-optic display devices such as liquid crystal display devices, and more particularly relates to DAC driver circuitry employed in such a system to convert incoming digital display signals to analog signals, and to address the display device with such analog signals.

Color display systems are known in which light bars of different colors are sequentially scrolled across a single electro-optic light modulator panel to produce a color display. See, for example, commonly assigned U.S. Pat. No. 5,532,763, incorporated herein by reference.

These display systems are particularly suitable for displaying color information in the form of continuously updated image information signals arranged in successive frames, such as color video information, in which each frame is composed of component color sub-frames, eg., red, green and blue sub-frames.

These systems employ an electro-optic light modulator comprised of a row-and-column matrix array of pixels, for modulating light in accordance with the image information signals during successive frame periods. The signal information is applied to the pixel rows of the array a line at a time during each frame period. Such a matrix array is preferably "active", ie., each pixel is connected to the array via an active switching element, in order to prevent crosstalk between pixels.

Because each sub-frame of information in a three color system must be addressed on a single electro-optic light modulator panel during one frame period, the addressing rate is three times faster than the rate for a three-panel system. At present, a reflective active-matrix liquid crystal display (AMLCD) on silicon employing a liquid crystal exhibiting the twisted nematic (TN) effect and transistors as the active switching elements, is the preferred electro-optic light modulator. Such a reflective device can support a high density of pixels, due to the fact that the wiring and switches can be integrated on the silicon substrate beneath the reflective electrodes. Moreover, such a device can be addressed at a much higher rate than prior transmissive devices.

Nevertheless, the fastest response time of the TN LC material, the time needed to drive the LC material to the dark state, is on the order of 100 microseconds, while the time for addressing a row is only 5 microseconds. Moreover, the pixel capacitance varies with both the applied voltage and time.

As a result, the accuracy of the display data transfer depends on the residual state of the previously stored information. This means that the brightness of a particular color depends on the brightness of the previous color. Two-dimensional look-up tables are presently used to provide correction values to the new signals, in order to avoid such color artifacts.

In published PCT application WO 96/00479, the problems of slow response time and varying pixel capacitance with voltage of a TN LC material in a single panel color sequential projector is approached by substituting an electro-optic material with a faster response time, and with capacitance subsantially independent of voltage, such as a ferroelectric LC material.

However, ferro-electric LC materials and similar electro-optic materials have a memory effect. Thus, WO 96/00479 teaches the use of a "blanking pulse", ie, an auxiliary signal, to reset the pixels prior to each new addressing with display data. Such a blanking pulse is applied during some part of the line selection period via either the row electrode or the column electrodes in combination with a reference electrode in the case where two-terminal devices such as diodes are used as the active matrix switching elements, or via a common counterelectrode in the case where three terminal devices such as TFTs are used as the active matrix switching elements.

Such a scheme requires separate means for generating the reset signal, either directly or as a combination of an auxiliary voltage and a reference voltage via a separate set of reference electrodes. Such circuit means are not readily integratable into drive circuitry which is designed to convert incoming digital information signals (eg., digital tv signals or computer display signals) to analog signals suitable for driving the display.

OBJECTS AND SUMMARY OF THE INVENTION

Accordingly, it is an object of the invention to provide driver circuitry for driving an electro-optic display device, in which the color artifacts caused by the residual state of the electro-optic material are reduced or eliminated without resort to correction of data signals based on the residual state of the pixels from previously addressed data signals, and without resort to separate means for generating a reset signal.

It is another object of the invention to provide an electro-optic display device incorporating such drive circuitry.

It is yet another object of the invention to provide a color display system incorporating such an electro-optic display device.

In accordance with the invention, color artifacts caused by the residual state of the pixels in an electro-optic display device from previously addressed data signals are substantially reduced or eliminated by providing means in a DAC driver circuit for resetting the pixels to a pre-determined state prior to addressing with the next set of data signals.

Preferably, the reset signal is derived from a global ramp generator and applied to selected pixels in advance of addressing with the next set of data signals.

In accordance with one aspect of the invention, a DAC driver circuit for an electro-optic display device comprises:

a control circuit for sequentially addressing the pixels of the device with analog display signals, the control circuit comprising selection means for selecting a row of pixels during a row selection period, and writing means for applying the analog signals to the selected pixels over one or more columns during the row selection period;

a DAC for converting a stream of incoming digital display signals into the analog display signals, the DAC including a ramp generator for generating an analog ramp down and sample-and-hold means for selecting an analog signal from the ramp corresponding to the sampled digital signal, and holding the analog signal for application to the selected pixels;

characterized in that the control circuit includes means for selecting pixels to be reset to a pre-determined state prior to writing, and means for applying a resetting pulse from the analog ramp generator to the selected pixels prior to selection of the analog information signals from the DAC, whereby the color artifacts caused by the residual state of the electro-optic material are reduced or eliminated.

Preferably, the resetting pulse from the analog ramp generator is applied to the selected pixels prior to generation of the ramp, and the pixels selected for resetting are advanced in the addressing sequence from the pixels selected for addressing.

For example, in a display device having N rows of pixels, in which the control circuit is set to select row n for addressing and row(s) m for reset, where m is from one to ten rows in advance of row n, eg., m=n+8.

In accordance with a preferred embodiment of the invention, the control circuit is set to select rows for addressing in the following sequence: n, n+1/3N, n+2/3N, n+1, n+1/3N+1, n+2/3N+1, n+2, n+1/3N+2, etc., and the rows selected for reset are in the sequence m, m+1/3N, m+2/3N, m+1, m+1/3N+1, m+2/3N+1, m+2, m+1/3N+2, etc.

An electro-optic display device incorporating the drive circuitry of the invention, as well as a display system incorporating such an electro-optic display device are included within the scope of the invention. Preferably, such a display system is a single-panel, scrolling color display system.

Use of the reset pulse obviates the need for guard bands between the scrolling color bands employed in prior versions of such a display system to guard against color artifacts. Elimination of the guard bands increases lumen throughput in such a system.

BRIEF DESCRIPTION OF THE DRAWING

FIGS. 6A and 6B are a timing diagram and a schematic diagram, respectively, of an SXGA row addressing circuit, enabling a resetting pulse to one row during a row period, eight rows prior to writing; and FIGS. 7A and 7B are a timing diagram and a schematic diagram, respectively, of an SXGA row addressing circuit, enabling a resetting pulse to eight successive rows during a row period, from one to eight rows prior to writing.

DESCRIPTION OF THE PREFERRED EMBODIMENTS

Figure 1:
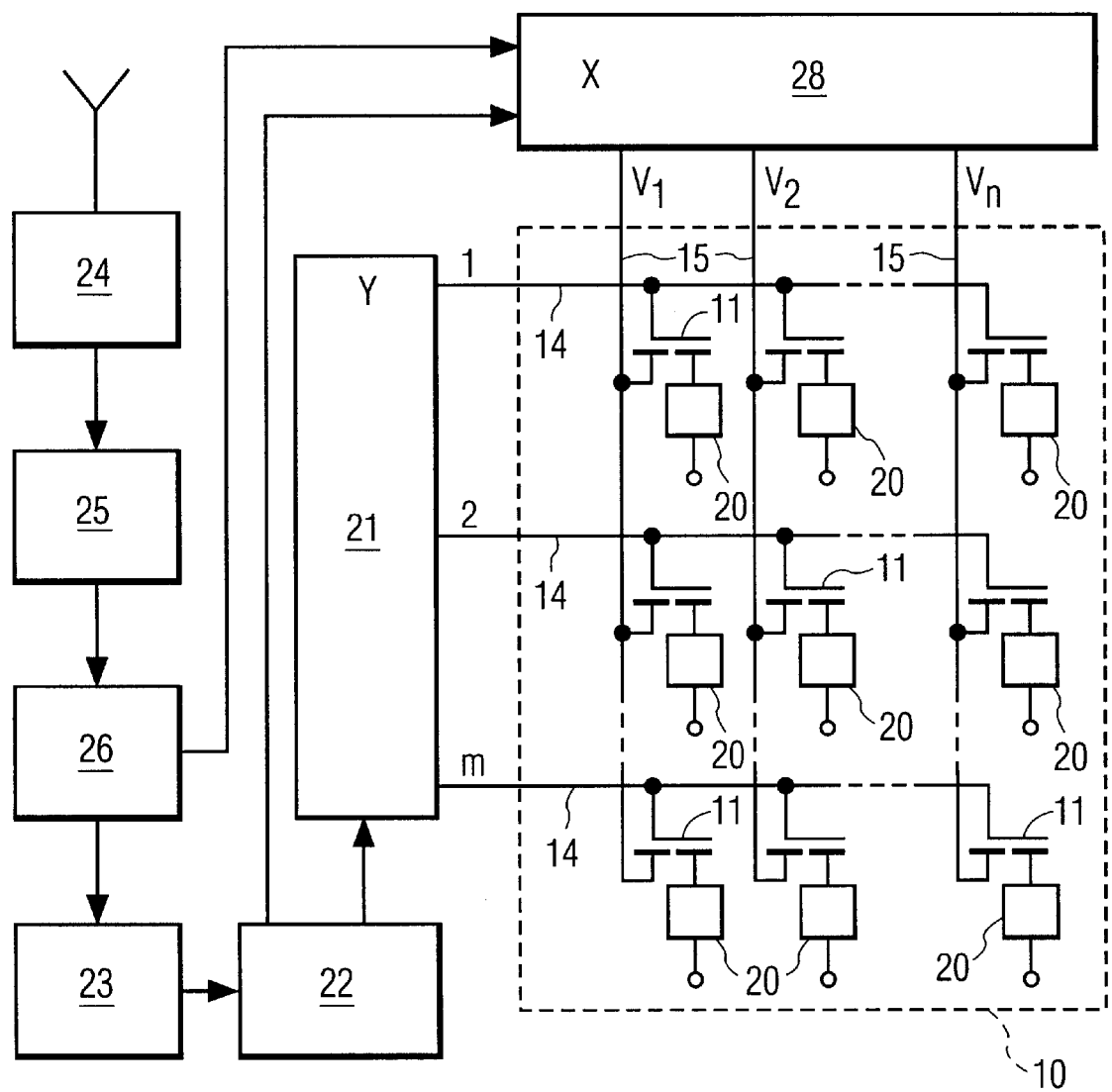
FIG. 1 is a simplified plan view of a typical AMLCD display device of the prior art.

Referring to FIG. 1, there is shown schematically a block diagram of a LCD-TV display system of the prior art including a display device which comprises an AMLCD panel 10. The panel 10 consists of m lines (1 to m) with n horizontal display (picture) elements or pixels 20 (1 to n) in each line. In practice, the total number of display elements (m×n) in the matrix array may be 100,000 or more (up to 1.3 million or more for HDTV). Each display element 20 (representing one pixel of the display) has an associated transistor acting as a switching element. The gates of all the transistors in each line are connected to a row (Y) electrode 14 and the source electrodes of each transistor in a column are connected to a column (X) electrode 15, there being m row electrodes 14 and m column electrodes 15. The drains of the transistors 11 are connected to respective electrodes of the display elements in a manner which will be described.

A common counter-electrode for the display elements is carried by a substrate spaced from the substrate carrying the transistors and the associated electrodes of the display elements with liquid crystal material disposed therebetween. The liquid crystal material modulates light according to an applied voltage.

Addressing of each line of the matrix array of display elements 20 is achieved by applying a gate voltage to the row electrode 14 for that line for an addressing time Ta. This turns on all transistors in that row of the matrix, allowing video information to be transferred to the display elements via the column electrodes 15. The row electrodes are sequentially addressed in this manner to provide line-at-a-time scanning of the entire matrix array. One completed scan of the matrix array represents one frame or sub-frame of video information, after which the array is re-addressed with the next frame or sub-frame of information.

During the time Ta in which the transistors in one line are turned on to allow addressing, all of the other transistors in the remaining rows of the array are switched off, thus isolating their associated picture elements from stray voltages which would otherwise introduce display-degrading cross-talk. During this time interval, these isolated picture elements must maintain their picture information by virtue of their natural capacitance and any auxiliary storage capacitance (not shown in this figure).

As can be seen in FIG. 1, the row (Y) electrodes 14 are driven by a digital shift register 21 supplied with regular timing pulses from a clock circuit 22 which is fed with line synchronizing pulses from a synchronization separator 23 derived from the incoming signals via a tuner 24, IF circuits 25 and video amplifier 26.

Video information signals are supplied to the column (X) electrodes 15 simultaneously from shift register circuit 28, comprising one or more shift registers, supplied with video signals from the video amplifier 26 and timing pulses from the clock circuit 22 in sync with line addressing. The shift register circuit provides serial-to-parallel conversion appropriate to the line-at-a-time addressing of the panel 10, samples the corresponding line in the digital video signal and places the appropriate analog voltages on the column (X) electrodes 15, thence to the source side of the transistors in the column. When the transistors in the line being addressed are turned on, the voltage at each source is transferred to the drain, and thence to the picture element connected to the drain, whereby the liquid crystal associated with the element is charged with the source voltage representing the video information for that element.

Figure 2:
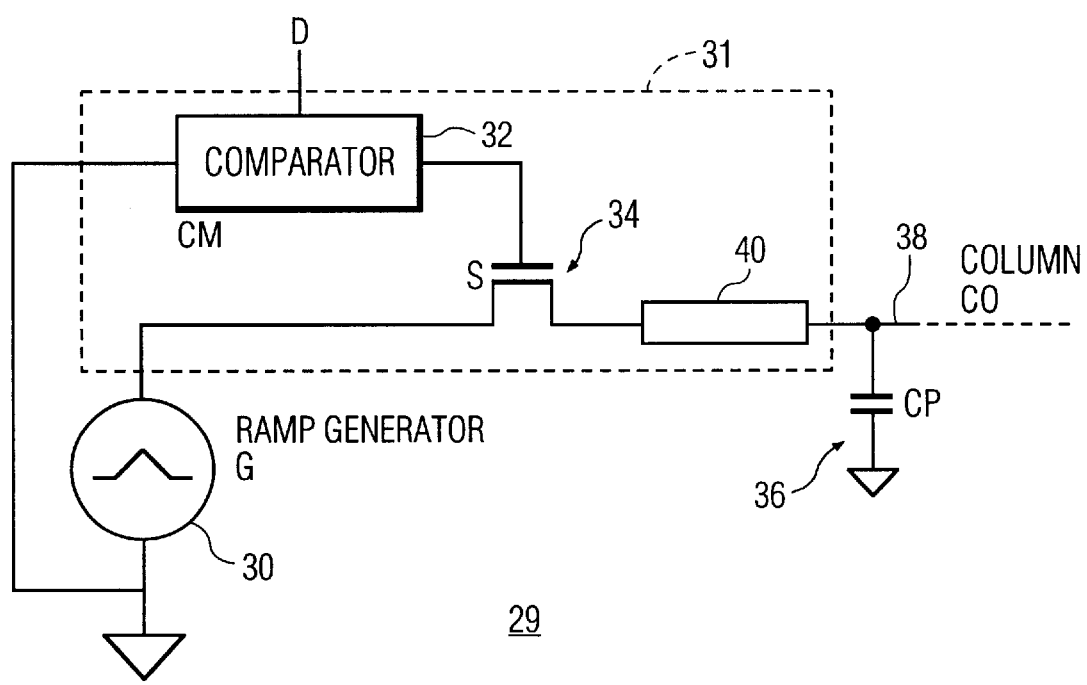
FIG. 2 is a schematic diagram of a track and hold sampling circuit of the prior art.

Referring now to FIG. 2, there is shown a schematic representation of a track and hold sampling circuit 29, in which a ramp generator 30 generates an analog ramp signal which ramps up from zero or a low value to a maximum value, and comparator 32 compares a digital word D representative of gray level information with the digital word representing the ramp signal. When the analog ramp signal reaches a value which matches the value represented by the digital word, switch 34 opens (i.e. isolates) and the analog signal is stored in the capacitance 36 of column 38.

Figure 3:
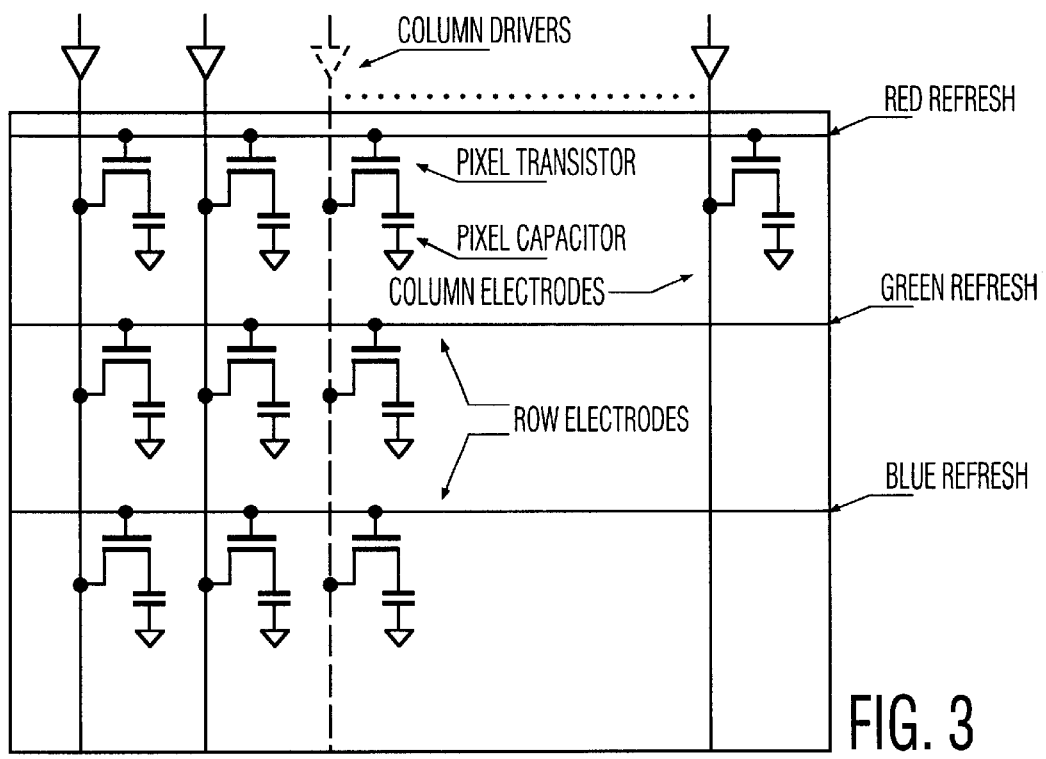
FIG. 3 is a diagrammatic illustration of a color sequential drive scheme for a single-panel three-color display device in accordance with the prior art.

FIG. 3 shows diagrammatically a color sequential drive scheme for a single-panel three-color display device of the prior art. While red, green and blue illumination bands scroll down from the top to the bottom of the display, pixel information for each color is updated, one row at a time, just prior to exposure to the illumination band of the corresponding color. This is accomplished by successively activating three rows, marked R, G and B, respectively, during a row selection period. As indicated in the first three lines of the timing diagram of FIG. 4, the sequence of selection is in the order R, G, B. That is, for a display of N rows, the row n is selected for refresh with R data, then the row n+1/3 N is selected for refresh with G data, then the row n+2/3 N is selected for refresh with B data, then row n+1 is selected for refresh with R data, and so on.

During each row selection period, analog signals corresponding to sampled display data, eg., video data, derived from ramp waveforms generated by a global ramp generator, (shown in the last line of the timing diagram of FIG. 4) are applied to the column electrodes and transferred to the pixel electrodes via the transistors. At the end of a row period, the transistors are switched off, and the data is stored in the pixels. The pixel capacitance is both voltage and time dependent. Response time for a fast switching TN LC material is on the order of about 100 microseconds, whereas the row period for an SXGA color video display (1024 rows) is typically only about 5 microseconds.

As a result, the accuracy of the video data transfer is affected. That is, the value of the information stored in each pixel is influenced by the residue of the previously stored value. Since each color is updated just prior to exposure to the illumination band of the corresponding color, the brightness of that color depends on the residual brightness of the previous color. To correct for this error, a compensation scheme is employed, in which correction signals derived from a two-dimensional look-up table (LUT) are applied.

Figure 5:
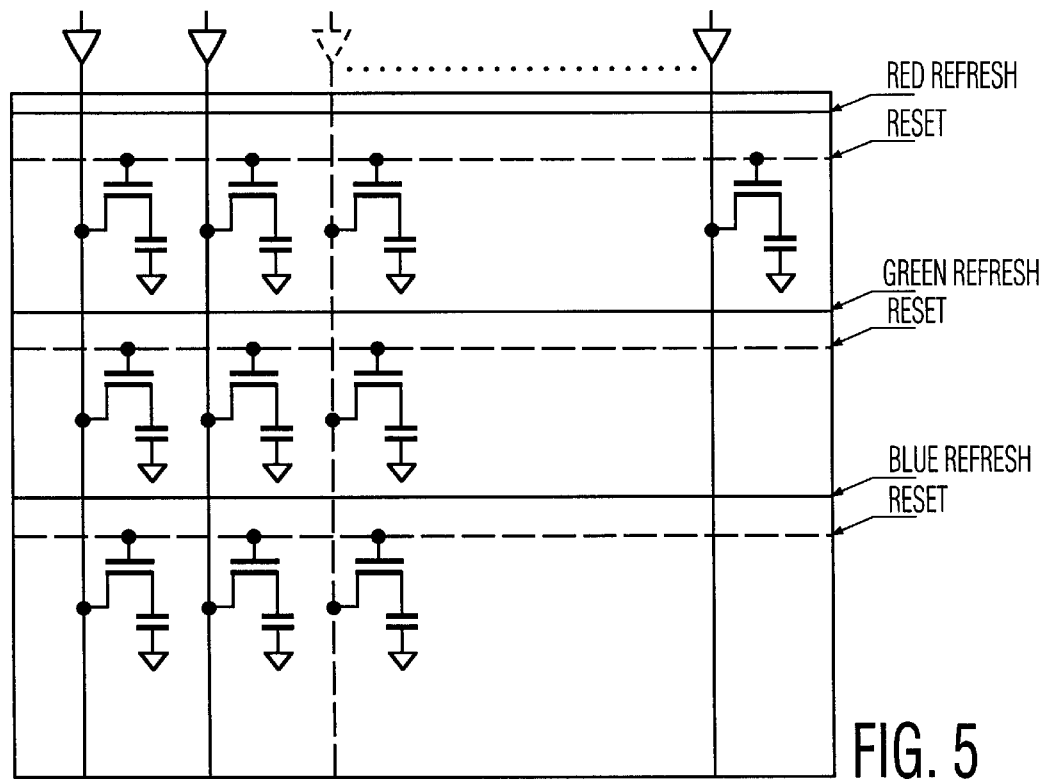
FIG. 5 is a diagrammatic illustration of a color sequential drive scheme similar to that of FIG. 3, including one embodiment of a resetting scheme of the invention.

In accordance with the teachings of the invention, to avoid the need for such a correction signal, and the LUT, a modified drive sequence as shown in FIG. 5 is employed. In this sequence, pixels are reset to a dark state prior to storing the next video data, by applying a reset pulse to an entire row of pixels a predetermined number of rows in advance of the row being updated or refreshed. This step eliminates any memory of previously stored information, provided the time elapsed between reset and refresh exceeds the settling time of the LC material. For a settling time of 100 microseconds and a row period of 5 microseconds, reset need only occur eight rows in advance.

Driving to a light state is of course also possible, which tends to result in a brighter display, but driving to a dark state is faster, and also tends to result in more saturated colors.

Figure 4:
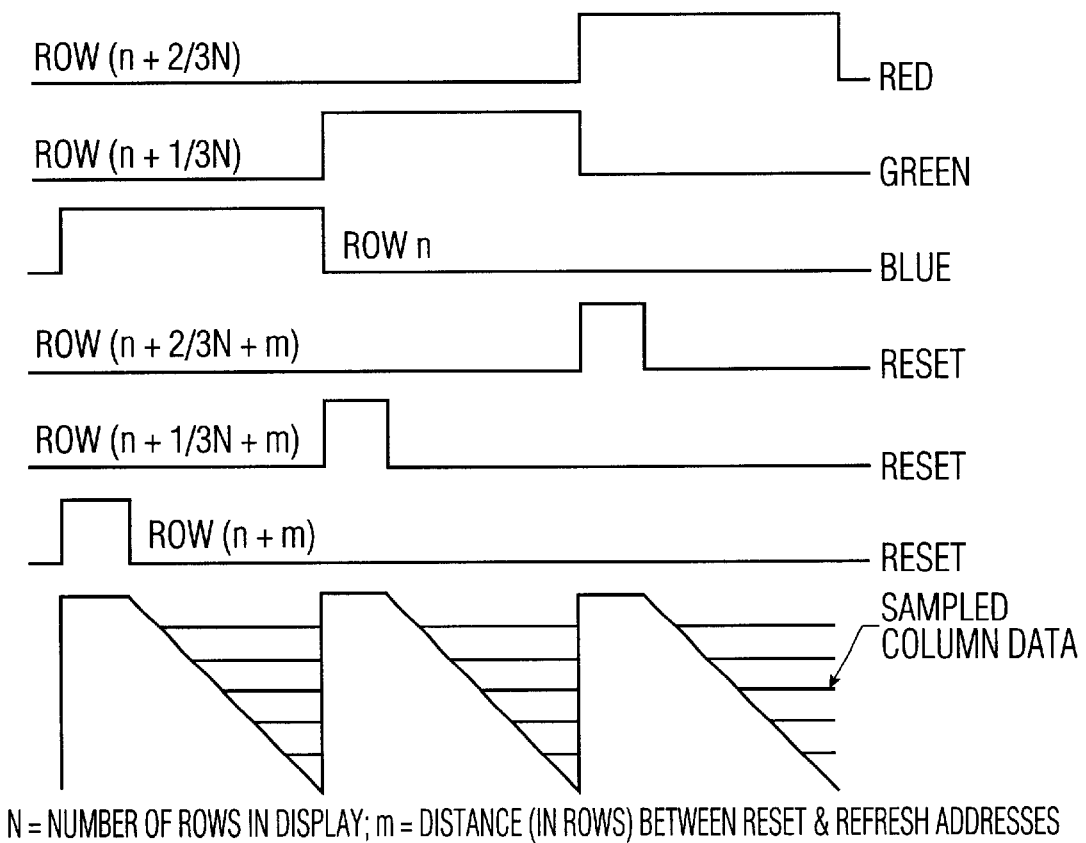
FIG. 4 is a timing diagram for the drive scheme of FIG. 3.

Resetting pulses are applied m rows in advance of each refresh, ie, in the sequence n+m, n+1/3 N+m, etc (shown in the fourth, fifth and sixth lines of the timing diagram of FIG. 4). It is also possible to reset more than one row at a time, eg., all eight rows in advance of the row being refreshed, or, n+1 through n+8.

The rows to be reset are activated during an initial part of the row selection period (first, second and third lines of FIG. 4), prior to generation of the ramp, when the ramp signal is at an extreme value (last line of FIG. 4). In this way, the intervals for reset and refresh overlap, so that clock and data rates remain unaffected.

FIGS. 6A and 6B show a timing diagram and an SXGA row addressing circuit, respectively, enabling a resetting pulse to be applied to one row during a row selection period, eight rows prior to writing. FIG. 6A shows the ramp signal, the row select signal and the row prewrite or reset signal, respectively. The ramp signal begins at a high absolute value and ramps down to a low absolute value, at which point the columns are discharged, and the ramp generator begins another ramp. The row select signal selects the row for prewrite during the interval between completion of one ramp (ramp signal has reached its lowest absolute value) and the return of the ramp signal to its highest absolute value. The row prewrite signal then signals the sample and hold circuit to apply the ramp signal to the pixels in the selected row during the interval prior to generation of the next ramp, during which the ramp signal is at its highest absolute value, thus resetting the pixels to their dark state prior to the next refresh.

The control circuit suitable for use in accomplishing the above sequence for an SXGA display having 1024 rows is shown in FIG. 6B. The ten bit row address for the row to be reset is fed into a selection means in the form of row Decoder 60. Writing means in the form of logic circuit 62, consisting of AND gates 63 and 64 and an OR gate 65, compares the Row Select and Row Prewrite signals with the row address, and provides control signals to Level Shifter 66 for application of the Row Select and Row Prewrite signals to the appropriate row.

An arrangement similar to that of FIGS. 6A and 6B is shown in FIGS. 7A and 7B, for the case in which eight rows n-1 through n-8 immediately prior to the row n being refreshed are all reset simultaneously. In this case, logic circuit 72 includes an additional OR gate 67, which receives input for rows n-1 through n-8 from Row Decoder 60 and sends its output to input 1 of AND gate 64.

As is known, most electro-optic display devices, and in particular liquid crystal display devices, are driven with AC voltage, commonly achieved by inverting the polarity of the driving waveform with each new frame of information. As is also known, the polarities of alternate columns (or rows), or sets of columns (or sets of rows) can also be inverted with each new frame. Nevertheless, it should be appreciated that the principle of the invention, ie, application of a high absolute value of the ramp signal as a resetting pulse to selected pixels prior to writing, is applicable regardless of these inversions of the polarities of the driving waveform.

The invention has been described in terms of a limited number of embodiments. Other embodiments, variations of embodiments and art-recognized equivalents will become apparent to those skilled in the art, and are intended to be encompassed within the scope of the invention, as set forth in the appended claims. For example, while the invention has been described mainly in the context of use in a single panel projection display system, it can also be used in standard three-panel systems to improve sharpness of moving objects (prevent "blurring" due to the same LC memory effect.

What is claimed is:

1. A driver circuit for an electro-optic display device comprising an active row-and-column matrix array of pixels, the driver circuit comprising:

a control circuit for sequentially addressing the pixels of the device with analog display signals, the control circuit comprising selection means for selecting a row of pixels during a row selection period, and writing means for applying the analog signals to the selected pixels over one or more columns during the row selection period;

a DAC for converting a stream of incoming digital display signals into the analog display signals, the DAC including a ramp generator for generating an analog ramp down from a high value to a low value during the row selection period, and sample-and-hold means for selecting an analog signal from the ramp corresponding to the sampled digital signal, and holding the analog signal for application to the selected pixels;

characterized in that the selection means of the control circuit is set to simultaneously with the selecting a row of pixels during a row selection period, selecting pixels to be reset to a pre-determined state prior to writing, and the writing means is set to apply a resetting pulse from the analog ramp generator to the selected pixels prior to selection of the analog information signals from the DAC, whereby the artifacts caused by the residual state of the electro-optic material are reduced or eliminated.

2. The driver circuitry of claim 1 in which the pixels selected for resetting are advanced in the addressing sequence from the pixels selected for addressing.

3. The driver circuitry of claim 1 in which the writing means of the control circuit is set to apply the resetting pulse from the analog ramp generator to the selected pixels prior to selection of the analog information signals from the DAC.

4. The driver circuitry of claim 3 in which the writing means of the control circuit is set to apply the resetting pulse from the analog ramp generator to the selected pixels prior to generation of the ramp.

5. The driver circuitry of claim 1 having N rows of pixels, in which the selection means of the control circuit is set to select row n for addressing and row(s) m for reset.

6. The driver circuitry of claim 5, in which m is from one to ten rows in advance of row n.

7. The driver circuitry of claim 5, in which m=n+8.

8. The driver circuitry of claim 5, in which the selection means of the control circuit is set to select rows for addressing in the following sequence: n, n+1/3N, n+2/3N, n+1, n+1/3N+1, n+2/3N+1, n+2, n+1/3N+2,.

9. An electro-optic display device incorporating the driver circuitry of claim 1.

10. A single-panel scrolling-color display system comprising at least two scrolling illumination bands of different colors and incorporating the display device of claim 9.

11. The display system of claim 10 in which there are no guard bands between the scrolling color bands.

* * * * *